United States Patent [19]

Miranti, Jr.

[11] Patent Number: 4,976,662
[45] Date of Patent: Dec. 11, 1990

[54] ENDLESS POWER TRANSMISSION BELT CONSTRUCTION AND METHOD OF MAKING THE SAME

[75] Inventor: Joseph P. Miranti, Jr., Nixa, Mo.
[73] Assignee: Dayco Products, Inc., Dayton, Ohio
[21] Appl. No.: 513,694
[22] Filed: Apr. 24, 1990

Related U.S. Application Data

[62] Division of Ser. No. 410,165, Sep. 20, 1989, Pat. No. 4,938,736, which is a division of Ser. No. 324,852, Mar. 17, 1989, Pat. No. 4,884,998, which is a division of Ser. No. 152,693, Feb. 5, 1988, Pat. No. 4,832,670.

[51] Int. Cl.$^5$ .................................. F16G 1/28
[52] U.S. Cl. ..................... 474/205; 156/137; 474/238; 474/250
[58] Field of Search ............. 474/202, 205, 249, 250, 474/265; 156/137, 138

[56] References Cited

U.S. PATENT DOCUMENTS 4,264,314  4/1981  Imamura .............................. 474/205
4,332,576  6/1982  Stecklein et al. .................... 474/205
4,647,278  3/1987  Hull ..................................... 474/205

OTHER PUBLICATIONS

Article in *Science News*, vol. 129, Jan. 4, 1986, pp. 12–13, entitled "Acoustic Residues".

*Primary Examiner*—Thuy M. Bui
*Attorney, Agent, or Firm*—Joseph V. Tassone

[57] ABSTRACT

An endless power transmission belt construction and method of making the same are provided, the belt construction having opposed side edges and having an inner surface defining a plurality of longitudinally disposed and alternately spaced apart projections and grooves for meshing with a ribbed surface of a rotatable pulley or the like and defining a plurality of transversely disposed and alternately spaced apart projections and grooves that respectively extend between and to the opposed side edges, the longitudinal spacings between the transverse grooves or/and the depths of the transverse grooves being staggered so as to tend to reduce noise during normal operation of the belt construction with the pulley or the like.

11 Claims, 4 Drawing Sheets

ENDLESS POWER TRANSMISSION BELT CONSTRUCTION AND METHOD OF MAKING THE SAME

CROSS REFERENCE TO RELATED APPLICATIONS

This application is a divisional patent application of its copending parent patent application, Ser. No. 410,165, filed Sept. 20, 1989, which, in turn, is a divisional patent application of its copending parent patent application, Ser. No. 324,852, filed Mar. 17, 1989, now U.S. Pat. No. 4,884,998, which, in turn, is a divisional patent application of its copending parent patent application, Ser. No. 152,693, filed Feb. 5, 1988, now U.S. Pat. No. 4,832,670.

BACKGROUND OF THE INVENTION

1. Field of the Invention

This invention relates to a new endless power transmission belt construction and to a new method of making an endless power transmission belt construction.

2. Prior Art Statement

It is known to provide an endless power transmission belt construction having opposed side edge means and having an inner surface means defining a plurality of longitudinally disposed and alternately spaced apart projections and grooves for meshing with a ribbed surface means of a rotatable pulley means or the like and defining a plurality of transversely disposed and alternately spaced apart projections and grooves. For example, see the Hull U.S. Pat. No. 4,647,278.

It is also known to provide alternately spaced apart projections and grooves in an endless power transmission belt construction wherein the longitudinal spacings between the transverse grooves or/and the depths of the transverse grooves are staggered so as to tend to reduce noise during normal operation of the belt construction. For example, see the Imamura U.S. Pat. No. 4,264,314.

It is also known to provide vehicle tires with treads and building ceilings with notches that respectively have spacings or depths that are staggered on the basis of a quadratic residue sequence based on a prime number. For example, see the article in *Science News*, Vol. 129, Jan. 4, 1986, pages 12-13, entitled "Acoustic Residues."

SUMMARY OF THE INVENTION

It is one feature of this invention to provide a new endless power transmission belt construction that has a plurality of longitudinally disposed and alternately spaced apart projections and grooves for driving against a similarly ribbed surface means on a rotatable pulley or the like and that has means for tending to reduce noise during normal operation of the belt construction with that pulley or the like.

In particular, it was found according to the teachings of this invention that even though the belt construction of the aforementioned Hull U.S. Pat. No. 4,647,278, was provided with a plurality of transversely disposed and alternately spaced apart projections and grooves along with the plurality of longitudinally disposed and alternately spaced apart projections and grooves in the inner surface means thereof, the spacings between the transverse grooves and the depths of the transverse grooves are uniform. Therefore, it is believed according to the teachings of this invention that if the longitudinal spacings between the transverse grooves or/and the depths of the transverse grooves are staggered, such staggering will tend to reduce the noise created by the normal operation of the belt construction with its associated pulley or the like.

For example, one embodiment of this invention provides an endless power transmission belt construction having opposed side edge means and having an inner surface means defining a plurality of longitudinally disposed and alternately spaced apart projections and grooves for meshing with a ribbed surface means of a rotatable pulley means or the like and defining a plurality of transversely disposed and alternately spaced apart projections and grooves that respectively extend between and to the opposed side edge means, the longitudinal spacings between the transverse grooves or/and the depths of the transverse grooves being staggered so as to tend to reduce the noise during normal operation of the belt construction with the pulley means or the like.

Accordingly, it is an object of this invention to provide a new endless power transmission belt construction having one or more of the novel features of this invention as set forth above or hereinafter shown or described.

Another object of this invention is to provide a new method of making an endless power transmission belt construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 2 is an enlarged, fragmentary, cross-sectional view taken on line 2—2 of FIG. 1 and illustrating the belt construction meshing with a ribbed surface means of a pulley means or the like.

FIG. 6 is an enlarged, fragmentary, cross-sectional view taken on line 6—6 of FIG. 5 and illustrates the belt construction meshing with a ribbed surface means of a pulley means or the like.

DESCRIPTION OF THE PREFERRED EMBODIMENTS

Figure 1:
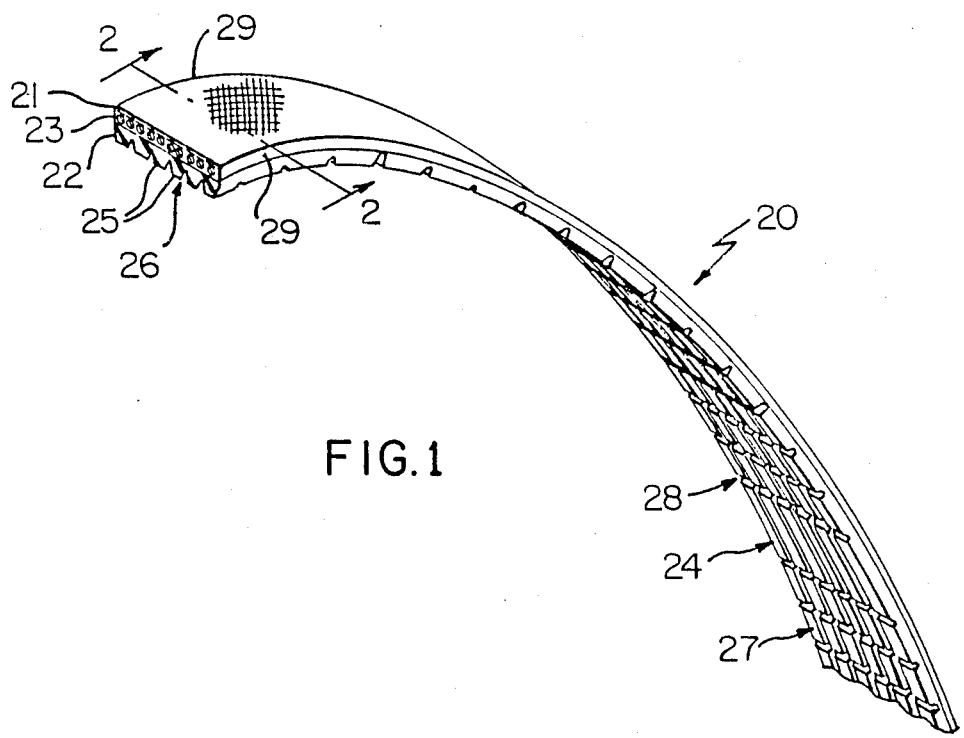
FIG. 1 is a broken away perspective view of one of the new endless power transmission belt constructions of this invention.

While the various features of this invention are hereinafter illustrated and described as being particularly adapted to provide an endless power transmission belt construction having longitudinal ribs or projections on the bottom surface means thereof for meshing with similar ribbed structure on a rotatable pulley, it is to be understood that the various features of this invention can be utilized singly or in various combinations thereof to provide an endless power transmission belt construction for operating on other surface means as desired.

Therefore, this invention is not to be limited to only the embodiments illustrated in the drawings, because the drawings are merely utilized to illustrate one of the wide variety of uses of this invention.

Referring now to FIGS. 1–4, a new endless power transmission belt construction of this invention is generally indicated by the reference numeral 20 and comprises an outer tension section 21, an inner compression section 22 and a load carrying section 23 secured to and disposed intermediate the tension section 21 and the compression section 22, the sections 21, 22 and 23 of the belt construction 20 being formed of conventional materials, such as mainly of polymeric materials, and in a conventional manner as is well known in the art of making endless power transmission belt construction whereby such materials and methods need not be specifically described as the same are well known in the art.

Figure 3:
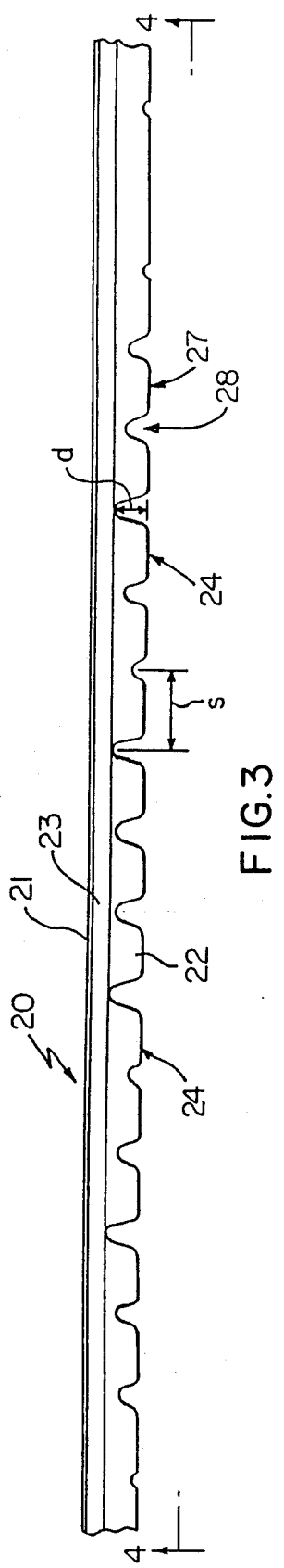
FIG. 3 is an enlarged fragmentary side view of a portion of the belt construction of FIGS. 1 and 2.
Figure 4:
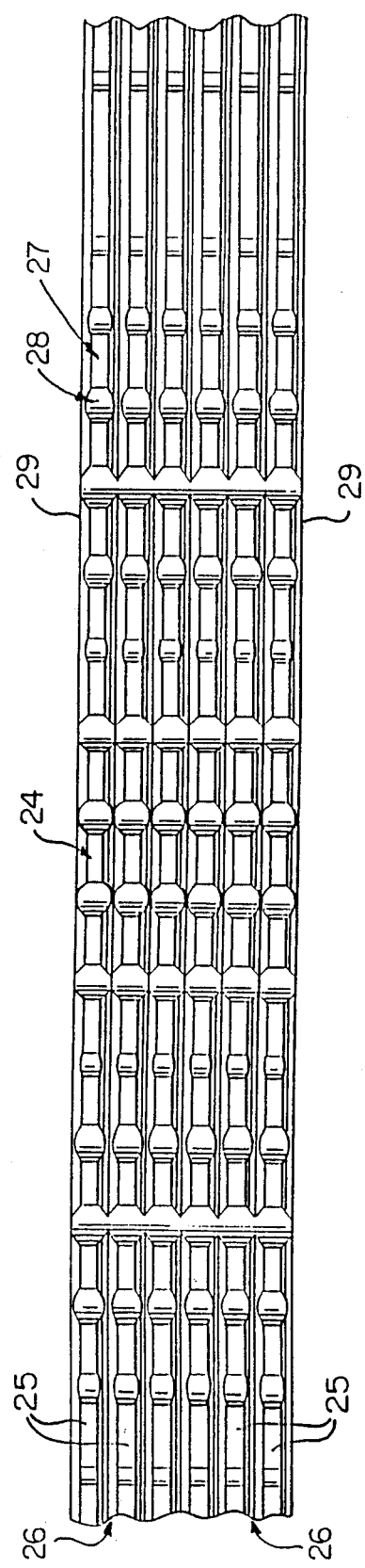
FIG. 4 is a fragmentary bottom view of the belt construction of FIG. 3 and is taken in the direction of the arrows 4—4 of FIG. 3.
Figure 5:
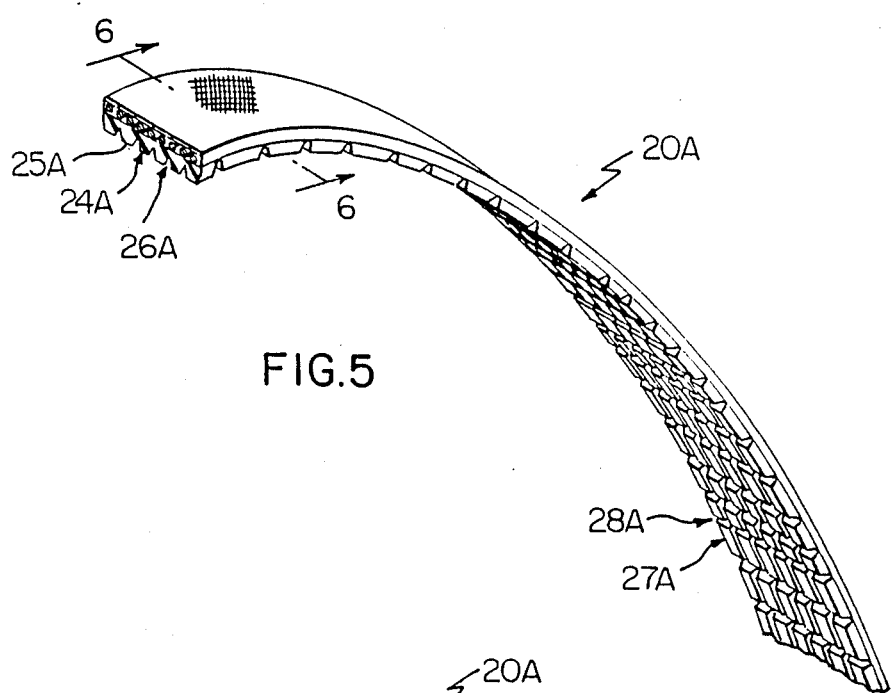
FIG. 5 is a view similar to FIG. 1 and illustrates another of the endless power transmission belt constructions of this invention.
Figure 6:
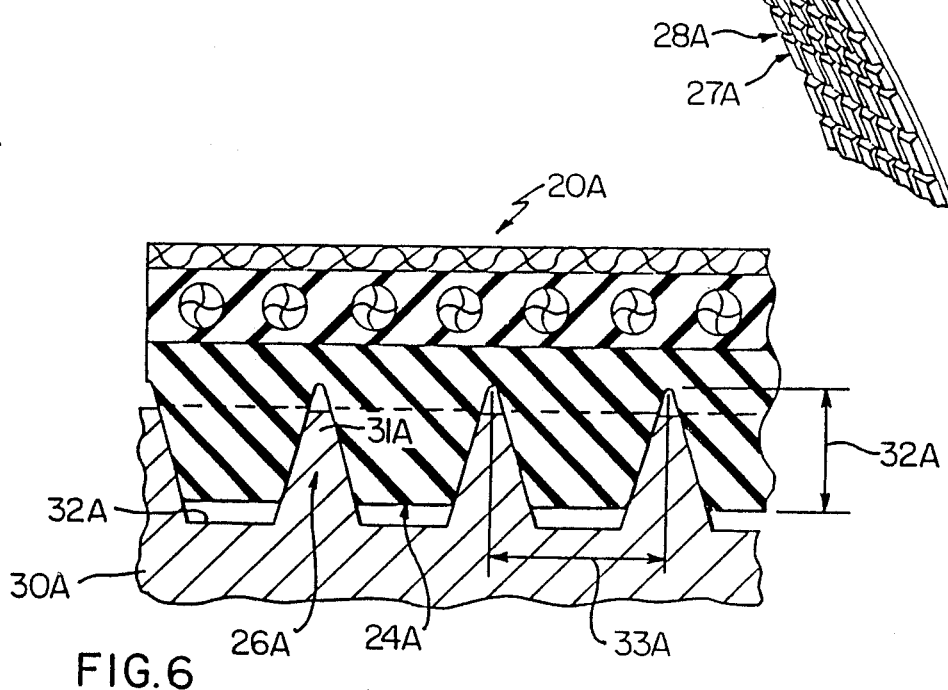

The inner compression section 22 of the belt construction 20 has an inner surface means 24 defining, in a manner hereinafter set forth, a plurality of longitudinally disposed and alternately spaced apart projections 25 and grooves 26 that are disposed substantially parallel to each other throughout the entire endless length thereof and a plurality of transversely disposed and alternately spaced apart projections 27 and grooves 28 that are disposed substantially parallel to each other throughout the longitudinal length of the belt construction 20 and that respectively extend between and to opposed side edge means 29 of the belt construction 20, the transverse projections 27 and grooves 28 being disposed substantially perpendicular to the longitudinal projections 25 and grooves 26 and forming a pattern in the surface means 24 as best illustrated in FIGS. 3 and 4.

As previously stated, it is known from the aforementioned Hull U.S. Pat. No. 4,647,278 to provide an endless belt construction having longitudinal and transversely disposed projections and grooves with the longitudinal projections and grooves meshing with a ribbed or multi-grooved surface means on a rotatable pulley or the like for transmitting motion therebetween and with the transverse projections and grooves providing flexibility to such belt construction whereby this Hull U.S. Pat. No. 4,647,278, is being incorporated into this disclosure by this reference thereto.

Figure 2:
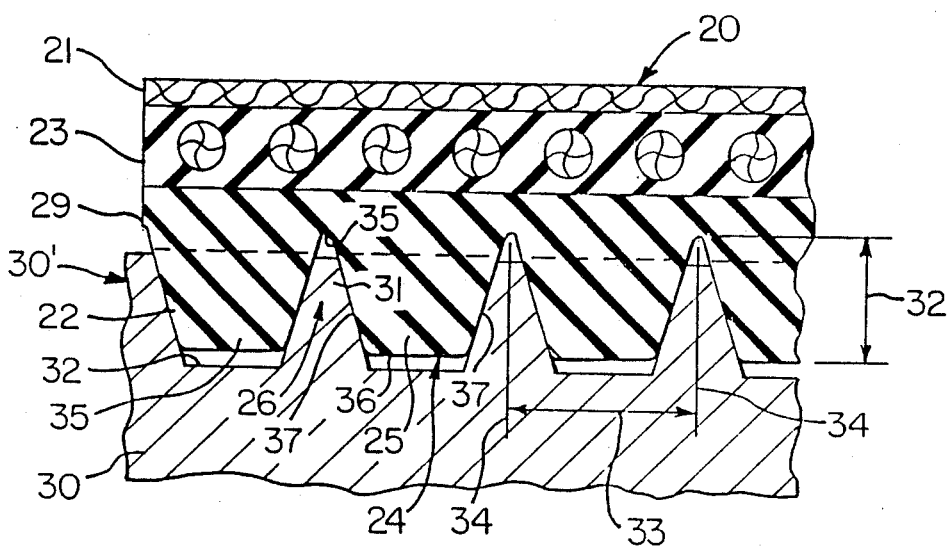

As illustrated in FIG. 2, the belt construction 20 of this invention is illustrated as engaging against a surface means 30' of a rotatable pulley 30, the surface means 30' of the pulley 30 having a plurality of alternately spaced apart projections 31 and grooves 32 that respectively mesh with the longitudinally disposed grooves 26 and projections 25 on the inner surface means 24 of the belt construction 20 so as to transmit driving movement therebetween while preventing lateral movement between the belt construction 20 and the member 30 relative to each other in a manner well known in the art, such an arrangement being fully disclosed in the Waugh U.S. Pat. No. 2,802,511, whereby this patent is being incorporated into this disclosure by this reference thereto.

However, it is believed according to the teachings of this invention that since the transverse projections of the aforementioned Hull U.S. Pat. No. 4,647,278, are uniformly spaced apart and have uniform depths throughout the longitudinal length of the belt construction, there is a tendency for such prior known belt construction to produce an adverse noise when running against the surface means 30' of the pulley means 30.

It is well known from the aforementioned Imamura U.S. Pat. No. 4,264,314, that operating noise of an endless belt construction that has its opposed side edge means engaging against angled sheave surfaces of a pulley construction can have the operating noise thereof reduced if such belt construction is provided with alternately spaced apart transverse projections and grooves that are disposed substantially parallel to each other but with the longitudinal spacings between the transverse grooves or/and the depths of the transverse grooves being staggered whereby this Imamura U.S. Pat. No. 4,264,314 is being incorporated into this disclosure by this reference thereto.

Accordingly, it is believed according to the teachings of this invention that the transverse grooves 28 of the belt construction 20 of this invention should have the longitudinal spacings therebetween or/and the depths of the transverse grooves 28 staggered to tend to reduce the noise of such a longitudinally grooved or ribbed belt construction operating with a ribbed surface of a pulley means or the like.

In particular, it is believed that such staggered relationship can be based on an acoustic phase grating generated from a quadratic residue sequence such as set forth in the aforementioned *Science News* article "Acoustic Residues" whereby this article is being incorporated into this disclosure by this reference thereto.

For example, the specific pattern shown in FIGS. 1–4 for staggering the depths of the grooves 28 has a depth d for each transverse groove 28 which is generated by multiplying m by the remainder left after squaring the sequence number (n equals 1, 2, 3, 4, etc.) of that groove 28 and dividing by the generating number, such as 17 (in mathematical notation, $d = m \cdot (n^2 \mathrm{MOD} 17)$) where m equals maximum groove depth divided by the generating number minus one. The multiple m could be any empirically chosen number such that normally the maximum groove depth is within the range of approximately 40% to 70% of the belt thickness, depending upon cord location.

While the longitudinal spacings s illustrated in FIGS. 3 and 4 between adjacent transverse grooves 28 are uniformly spaced, it is to be understood that the same could be randomly staggered if desired. Alternately, the longitudinal spacings s between the adjacent grooves 28 could be varied at random or by a generator function similar to the one discussed above for the depths d thereof or by other means as desired.

While it should be appreciated that the most effective reflection phase grating is based on a quadratic residue sequency based on the prime number 17, other generators may also be feasible. For example, sequences based on the prime sequence 17, 19, 23 are known to be useful for reducing generated noise in the tire industry. Higher order generators may also be useful, such as the function based on $n^3$.

As previously stated, the surface means 24 of the belt construction 20 could be formed in any suitable manner, such as being formed by first molding the transverse projections 27 and grooves 28 into the compression section 22 by utilizing an internally ribbed curing jacket that was compressed against the compression section 22 by steam and pressure in a conventional manner of forming a bottom cogged or bottom toothed belt construction during a heat curing operation on the belt construction. For example, see the aforementioned Waugh U.S. Pat. No. 2,802,511.

Thereafter, the longitudinally disposed projections 25 and grooves 26 can be cut into the thus molded and cured belt construction 20 by a fly cutting operation as fully disclosed and claimed in the patent to Hetz, U.S. Pat. No. 2,496,269 whereby this patent is being incorporated into this disclosure by this reference thereto.

However, it is believed according to the teachings of this invention that the building of the belt construction 20 of this invention and the forming of the transverse projections 27 and grooves 28, as well as the forming of the longitudinally disposed projections 25 and grooves 26 could be made in other manners as desired.

For example, it is believed that the longitudinally disposed projections 25 and grooves 26 could be molded at the same time that the transverse projections 27 and grooves 28 are being molded into the compression section 22.

Also, it is believed that the longitudinally disposed projections 25 and grooves 26 could be cut by a grinding operation rather than by a milling operation if desired.

In one working embodiment of the belt construction 20 of this invention, the belt construction 20 has a standard longitudinally ribbed arrangement, such as set forth in the aforementioned Hull U.S. Pat. No. 4,647,278, wherein the depth 32 (FIG. 2) of each longitudinal groove 26 is approximately 0.95 (plus or minus 0.010) of an inch and the pitch or transverse distance 33 between the center lines 34 of adjacent grooves 26 is approximately 0.140 (plus or minus 0.002) of an inch. The bottom 35 of each longitudinal groove 26 is defined by a radius of approximately 0.004 (plus or minus 0.002) of an inch while the longitudinal projections 25 each has a substantially flat free end surface 36 that is not cut away and thereby is as molded. However, the cutting operation to form the longitudinal projections 25 and grooves 26 causes the projections 25 to have substantially flat facing faces 37 therebetween of approximately 40° (plus or minus 2.8°). Also, such cutting operation for forming the longitudinal projections 25 and grooves 26 forms the opposed ends 36' of the free ends 36 of the projections 25 to each have a radius of approximately 0.010 (plus or minus 0.002) of an inch.

Such working embodiment of the belt construction 20 has a maximum depth d for the transverse grooves 28 of approximately 0.136 of an inch whereby the average depth is approximately 0.068 of an inch. The spacing s is uniform and is approximately 0.306 of an inch while the facing sides of adjacent transverse projections make an angle of approximately 30°. The length of the belt construction is approximately 20.808 inches and therefore has four repeating sequences therein for the staggered depth pattern thereof.

Another endless power transmission belt construction of this invention is generally indicated by the reference numeral 20A in FIGS. 5-9 and parts thereof similar to like parts of the belt construction 20 previously described are indicated by like reference numerals followed by the reference letter "A".

As illustrated in FIGS. 5-9, the belt construction 20A has its inner surface means 24A provided with the plurality of alternately spaced apart projections 25A and grooves 26A for meshing with the grooves 32A and projections 31A on the pulley means 30A for the reasons previously set forth, the inner surface means 24A also having a plurality of transversely disposed and alternately spaced apart projections 27 and grooves 28 wherein the spacings sA between adjacent grooves 28A are staggered so as to tend to reduce noise during normal operation of the belt construction 20A with the pulley means 30A for the reasons previously set forth.

In fact, the matrix which forms the transverse projections 27A and grooves 28A of one working embodiment of the belt construction 20A of this invention is based on a like matrix that has been utilized in the past to form transverse grooves and projections in the inner surface means of an endless belt construction that drives through its angled side edges in substantially the same manner as the aforementioned Imamura U.S. Pat. No. 4,264,314.

Figure 7:
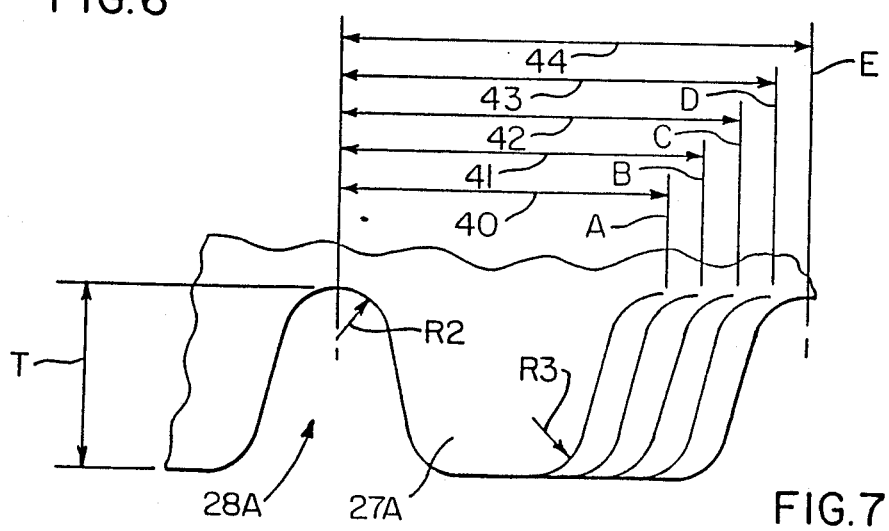
FIG. 7 is a fragmentary and schematic side view illustrating how the longitudinal spacings between the transverse grooves of the belt construction of FIG. 5 are developed.
Figure 8:
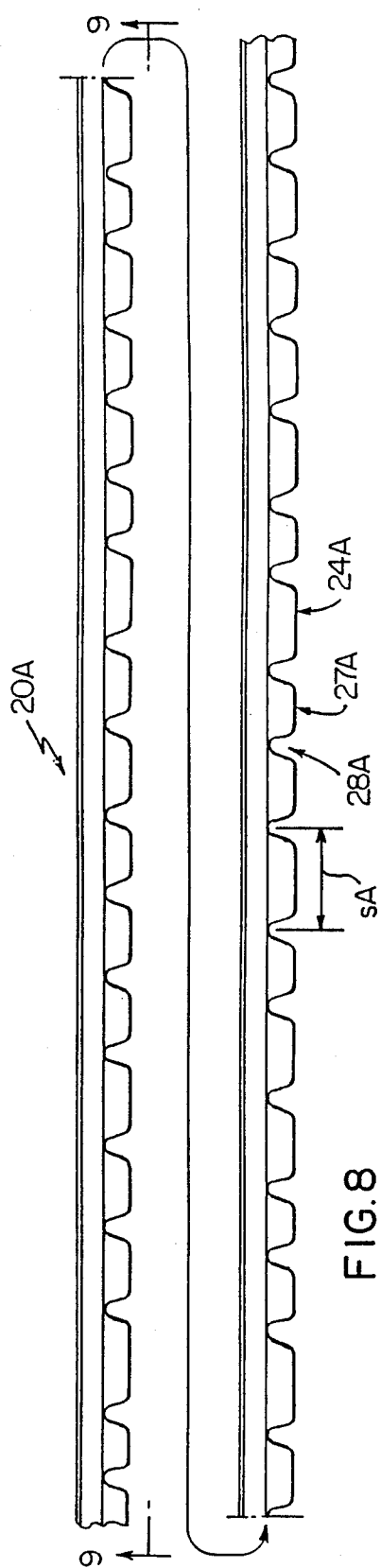
FIG. 8 is an enlarged fragmentary side view of the belt construction of FIG. 5 and illustrates one complete sequence of the staggered pattern of the longitudinal spacings between the transverse grooves thereof.
Figure 9:
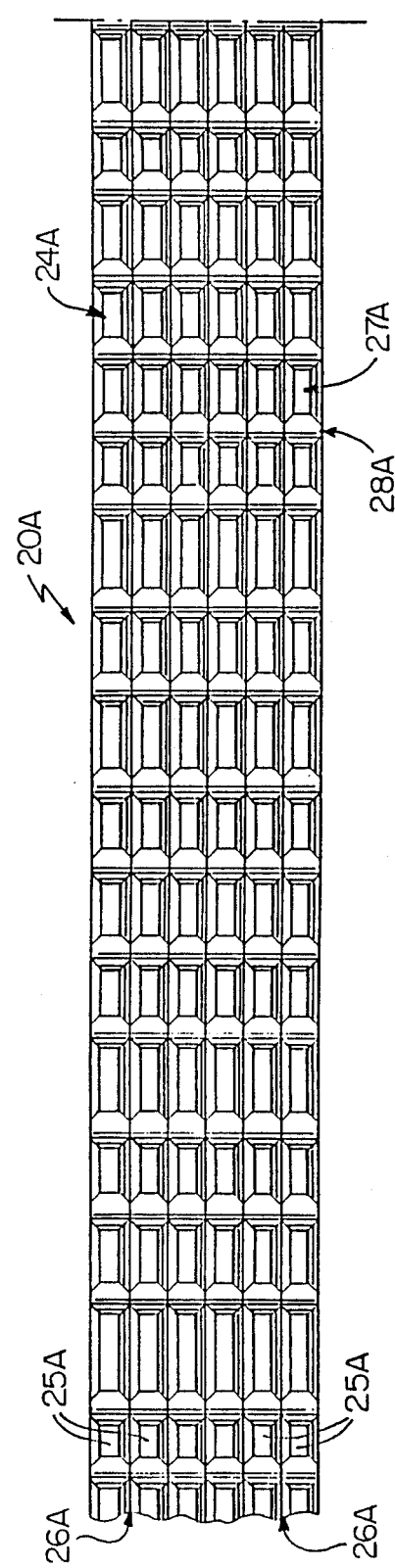
FIG. 9 is a fragmentary bottom view of the belt construction illustrated in FIG. 8 and is taken in the direction of the arrows 9—9 of FIG. 8.

In particular, it can be seen in FIG. 7 that the transverse projections 27A for the belt construction 20A are formed from having the adjacent transverse grooves 28A thereof spaced apart by five different spacings 40, 41, 42, 43 and 44 respectively being defined by lines A, B, C, D, and E as illustrated. By so arranging the spacings 40-44, a generally random staggered spacing sA arrangement can comprise a sequence of 34 spacings A-E with the belt construction 20A then having a repeating of such a sequence of spacings over and over again throughout the entire longitudinal length of the belt construction 20A. In the one working embodiment of the belt construction 20A, each sequence comprises the following order: AECCDBCBDCEABBCADCEBADDBECBEADCBDC.

Such working embodiment of the belt construction 20A of this invention has the length of the spacings 40-44 respectively as 0.250 of an inch; 0.281 of an inch; 0.313 of an inch; 0.344 of an inch and 0.375 of an inch while the average depth T, FIG. 7, of each transverse groove 28A is approximately 0.105 of an inch with the radius R2 and R3 illustrated in FIG. 7 each being approximately 0.045 of an inch. Such working embodiment of the belt construction 20A has the dimensions of the longitudinal projections 25A and grooves 26A formed in the same manner as the projections 25 and grooves 26 previously set forth and will not be repeated and like reference numerals of FIG. 2 are utilized in FIG. 6 except that the same are followed by the reference letter "A".

However, it is to be understood that while certain specific dimensions have been previously set forth for the belt constructions 20 and 20A, this was merely for example only and not to be a limitation on the claimed inventions.

Thus, it can be seen that this invention not only provides a new endless power transmission belt construction, but also this invention provides a new method of making an endless power transmission belt construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making an endless power transmission belt construction having opposed side edge means and having an inner surface means defining a plurality of longitudinally disposed and alternately spaced apart projections and grooves for meshing with a ribbed surface means of a rotatable pulley means or the like and defining a plurality of transversely disposed and alternately spaced apart projections and grooves that respectively extend between and to said opposed side edge means, the improvement comprising the step of forming the longitudinal spacings between said transverse grooves to be staggered so as to tend to reduce noise during normal operation of said belt construction with said pulley means or the like, the step of forming causing said longitudinal spacings to comprise different lengths that are arranged in a random sequence of a certain number of said lengths with that sequence then being repeated throughout the length of said belt construction in the longitudinal direction thereof, the step of forming comprising the step of first forming said transversely disposed and alternately spaced apart projections and grooves in a surface means of a belt sleeve and then the step of forming said longitudinally disposed and alternately spaced apart projections and grooves in said surface means of said belt sleeve.

2. A method as set forth in claim 1 where the step of forming said transversely disposed and alternately spaced apart projections and grooves in said surface means of said belt sleeve comprises the step of compressing an internally ribbed curving jacket against said surface means of said belt sleeve.

3. A method as set forth in claim 2 where the step of forming said longitudinally disposed and alternately spaced apart projections and grooves in said surface means of said belt sleeve comprises the step of cutting said longitudinal grooves in said surface means of said belt sleeve.

4. A method as set forth in claim 3 wherein the average length of said longitudinal spacings is between approximately 0.3 of an inch and approximately 0.4 of an inch.

5. A method as set forth in claim 4 wherein said average length is approximately 0.313 of an inch.

6. A method as set forth in claim 5 wherein said longitudinal spacings comprise five different lengths that are arranged in said random sequence of a certain number of said lengths with the sequence then being repeated throughout the length of said belt construction in the longitudinal direction thereof.

7. A method as set forth in claim 3 wherein the depths of said transverse grooves are substantially uniform.

8. A method as set forth in claim 7 wherein the depth of each said transverse groove is approximately 0.105 of an inch.

9. A method as set forth in claim 3 wherein the depths of said transverse grooves are staggered.

10. A method as set forth in claim 9 wherein said depths of said transverse grooves are staggered in a generally random manner.

11. A method as set forth in claim 10 wherein said depths are staggered in a sequence calculated from a general formula utilizing a certain generating number with that sequence then being repeated throughout the length of said belt construction in the longitudinal direction thereof.

* * * * *

Disclaimer 4,976,662—*Joseph P. Miranti, Jr.*, Nixa, Mo. ENDLESS POWER TRANSMISSION BELT CONSTRUCTION AND METHOD OF MAKING THE SAME. Patent dated Dec. 11, 1990. Disclaimer filed Mar. 4, 1991, by the assignee, Dayco Products, Inc.

The term of this patent subsequent to May 23, 2006, has been disclaimed.
[ *Official Gazette June 11, 1991* ]